United States Patent
Derito

[11] Patent Number: 5,029,883
[45] Date of Patent: Jul. 9, 1991

[54] GOLF CLUB BAG CART

[75] Inventor: Horacio P. Derito, Buenos Aires, Argentina

[73] Assignee: Iron Golf Corporation, Le Juene, Fla.

[21] Appl. No.: 486,995

[22] Filed: Mar. 1, 1990

[51] Int. Cl.[5] ............................. B62B 1/12; B62B 1/14
[52] U.S. Cl. .................................... 280/35; 280/47.26; 280/DIG. 6
[58] Field of Search ............... 280/35, 47.26, 47.33, 280/47.315, 655.1, 652, DIG. 6, 47.24, 645, DIG. 5, 646, 655

[56] References Cited

U.S. PATENT DOCUMENTS

| | | | |
|---|---|---|---|
| 1,424,528 | 8/1922 | Squire | 280/47.24 X |
| 2,040,339 | 5/1936 | Ross | 280/47.26 |
| 2,073,114 | 3/1937 | Martin et al. | 280/DIG. 6 X |
| 2,124,265 | 7/1938 | Sinnott | 280/DIG. 6 X |
| 2,405,674 | 8/1946 | Schliwa et al. | 280/35 X |
| 2,411,965 | 12/1946 | Hartung | 280/DIG. 6 X |
| 2,417,644 | 3/1947 | Graham | 280/47.24 X |
| 2,417,918 | 3/1947 | Fatur | 280/47.24 X |
| 2,575,930 | 11/1951 | Schwartz | 280/DIG. 6 X |
| 2,626,815 | 1/1953 | Chamberlin | 280/DIG. 6 X |
| 2,679,402 | 5/1954 | Sawyer et al. | 280/646 |
| 2,698,040 | 12/1954 | Wilkens | 280/DIG. 6 X |
| 2,741,490 | 5/1956 | Chamberlin et al. | 280/DIG. 6 X |
| 2,868,559 | 1/1959 | Vincelette | 280/DIG. 6 X |
| 3,150,736 | 9/1964 | Kaufman | 280/DIG. 5 X |
| 3,661,414 | 5/1972 | Roth | 280/47.24 X |
| 4,062,564 | 12/1977 | Schimmeyer | 280/DIG. 6 X |
| 4,767,001 | 8/1988 | Kim | 280/DIG. 6 X |

FOREIGN PATENT DOCUMENTS

| | | | |
|---|---|---|---|
| 619918 | 5/1961 | Canada | 280/DIG. 6 |
| 2488139 | 2/1982 | France | 280/DIG. 6 |

Primary Examiner—Andres Kashnikow
Assistant Examiner—Brian L. Johnson
Attorney, Agent, or Firm—J. Sanchelima

[57] ABSTRACT

A collapsible golf cart for transporting golf bags and, when resting, standing in a substantially vertical position. The cart includes a base assembly with a round bottom member and a upwardly extending wall with a sufficiently large diameter to snugly receive the bottom of the golf bag. An elongated support member is removably mounted to the base assembly and extends upwardly. The upper section of the bag is urged downwardly against the round bottom member thereby keeping it in place. A bent portion of the elongated support member permits access to lateral pockets commonly found in golf bags.

3 Claims, 2 Drawing Sheets

GOLF CLUB BAG CART

BACKGROUND OF THE INVENTION

1. Field of the Invention

The present invention relates to golf carts, and more particularly, to those carts that include collapsible assemblies.

2. Description of the Related Art

Applicant believes that the closest reference corresponds to U.S. Pat. No. 2,741,490 issued to J.F. Chamberlin in 1956. However, it differs from the present invention because it is not collapsible, lacks a round base for holding the golf club bag and the fastening assembly is rather complicated.

Other patents describing the closest sugject matter provide for a number of more or less complicated features that fail to solve the problem in an efficient and economical way. None of these patents suggest the novel features of the present invention.

SUMMARY OF THE INVENTION

It is one of the main objects of the present invention to provide a collapsible golf cart that is capable of being stored in the trunk of most automobiles and even checked in with the airlines.

It is another object of this present invention to provide a golf cart wherein the base support cooperative receives the bottom of the golf club bag and the bag itself is held in a substantially vertical position.

It is still another object of this present invention to provide a golf club bag that can be easily pulled by the user and most of the weight is projected downwardly over the wheels so that the user does not have to carry it.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figures 1, 2:
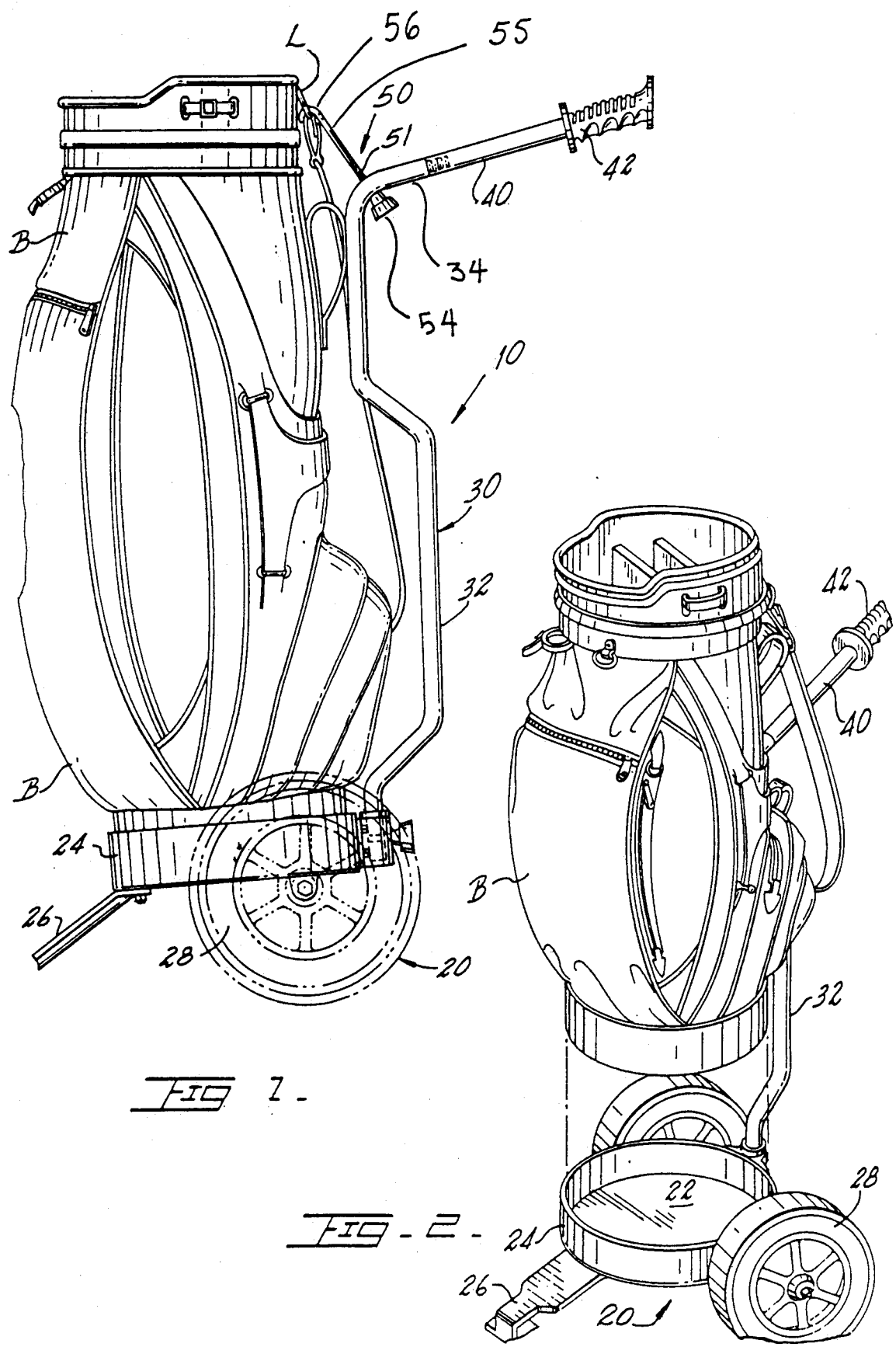
FIG. 1 represents a side view of an embodiment incorporating the present invention carrying a conventional golf club bag.
FIG. 2 is an inclined view of the golf cart and golf bag shown in figure one where the latter is being transported away from the base.

Referring now to figure 1, where the present invention is generally referred to with numeral 10, it can be observed that it basically includes wheeled base assembly 20 that supports golf club bag B, elongated support member 30, handle member 40 and fastening assembly 50.

Base assembly 20, as best seen in figure 2, includes a round bottom member 22 and a peripheral upwardly extending wall 24 of sufficiently large diameter to snugly and cooperatively receive the lower end of golf bag B. Leg member 26 is mounted to the underside of bottom member 22 and, in combination with wheels 28, maintain base assembly 20 in a substantially horizontal position with a slight forward inclination. In this manner, golf bag B rests in a substantially vertical position and the weight is distributed evenly. It is desirable for the golf player to have golf bag B in a substantially vertical position but never in an exact vertical position. If bag B is in an exact vertical position, the bag B and cart 10 combination is structurally unstable and bag B can fall to the side. With a substantially vertical position of golf bag B, a user can see the numbers of the clubs and pull them up without having to bend over to the side.

Elongated support member 30 is removably mounted to base assembly 20, preferably at a point diametrically opposite to leg member 26. Member 30 includes an outwardly bent section 32 that clears the typical contour of golf bags B to allow access to the user to pockets commonly found on the sides of bag B.

Figure 3:
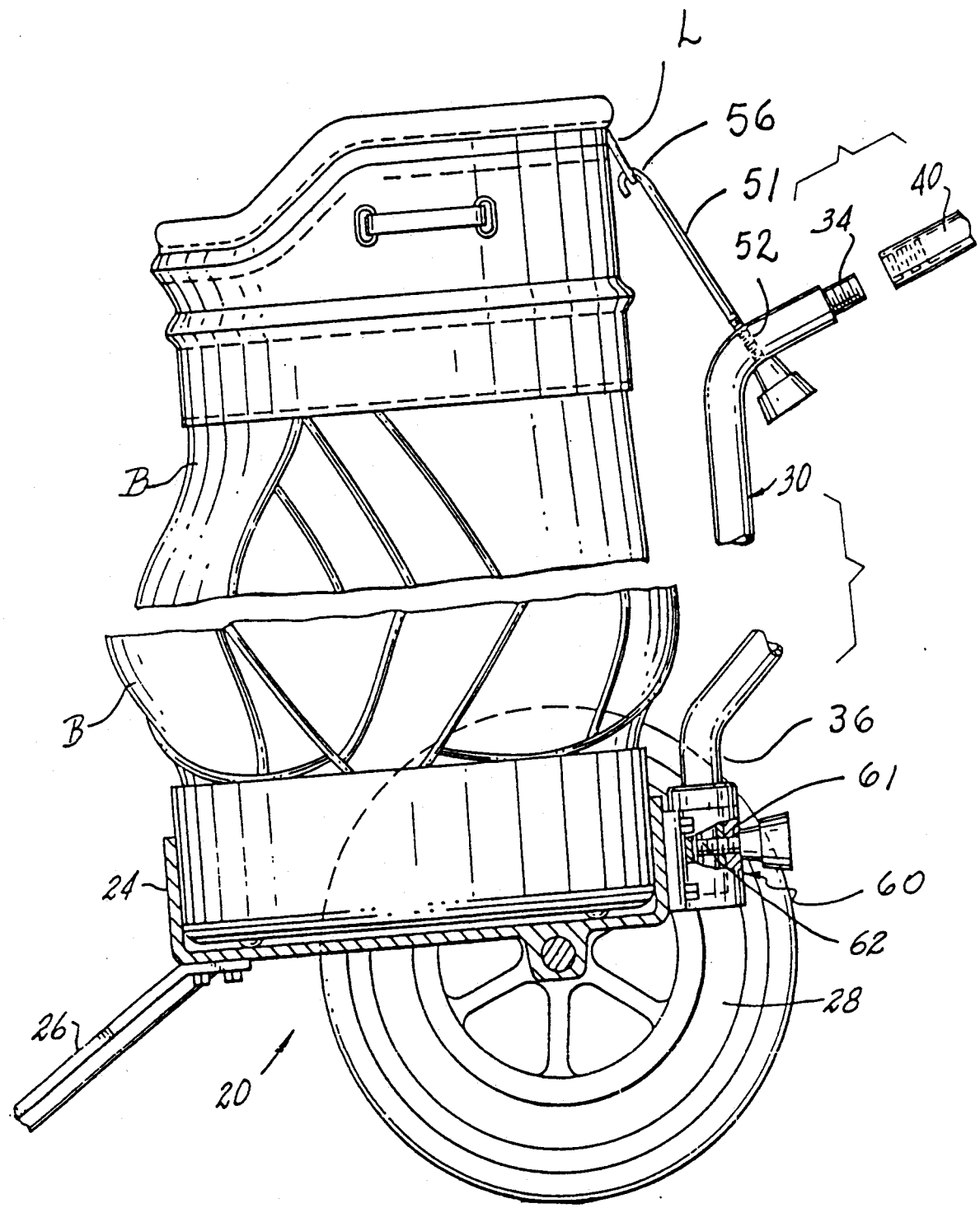
FIG. 3 illustrates an enlarged side broken view of the base section of the golf cart and the upper section illustrating a preferred embodiment for the engagement with the golf bag.

Handle member 40 is removably mounted to upper end 34 of elongated support member 30 and it includes a handle grip section 42 at its distal end. As best in figure 3, lower end 36 of elongated support member 30 is removably mounted to wall 24 through lower fastening assembly 60. Assembly 60 includes threaded pin 62 that is inserted through threaded opening 61 and penetrates inside lower end 36 keeping it in place.

Fastening assembly 50 has a J-shape member 55 and includes a straight portion 51 that is inserted through opening 52. The hook termination 56 of member 50 cooperatively engages with loop L commonly found in bags B. The end that includes threaded portion 51 cooperatively receives internally threaded knob 54 that, when turned, brings bag B towards member 30 and against base assembly 20 keeping bag B in place.

It is believed the foregoing description conveys the best understanding of the objects and advantages of the present invention. Different embodiments may be made of the invention concept of this invention. It is to be understood that all matter disclosed herein is to be interpreted merely as illustrative, and not in a limiting sense.

What is claimed is:

1. A golf cart for carrying and transporting a golf bag having upper and lower ends and including side pockets and a loop at the upper end of said golf bag, comprising:
   A. base assembly means having an underside with wheels mounted thereon and a leg member mounted to said underside so that said base assembly means is kept in a substantially horizontal position with a sufficient inclination toward said leg member to provide structural stability to said cart and golf bag and wherein said base assembly means includes second fastening means for removably securing said elongated support means to said base assembly means;
   B. elongated support assembly having two ends and one of said ends being removably and substantially perpendicularly mounted to said base means and wherein said elongated support assembly includes a bent section so that there is a clearance between said elongated support means and said golf bag; and
   C. first fastening means for securing said bag through said loop and urging said bag substantially downwardly against said base assembly means so that said bag is kept in place and wherein said first fastening means includes a J-shaped member having a threaded straight portion and a hook portion and said hook portion engages said loop and further including an internally threaded knob assembly that cooperatively receive said threaded straight portion for urging said bag against said base assembly means thereby keeping said bag firmly in place.

2. The golf cart set forth in claim 1 wherein said base assembly means includes a peripheral perpendicularly extending wall that snuggly receives said golf bag.

3. The golf cart set forth in claim 2 further including:
 a handle member removably mounted to the other end of said elongated support means.

* * * * *